United States Patent [19]

Fleck et al.

[11] Patent Number: 5,454,090
[45] Date of Patent: Sep. 26, 1995

[54] APPARATUS FOR FURNISHING INSTRUCTIONS IN A MICROPROCESSOR WITH A MULTI-STAGE PIPELINE PROCESSING UNIT FOR PROCESSING INSTRUCTION PHASE AND HAVING A MEMORY AND AT LEAST THREE ADDITIONAL MEMORY UNITS

[75] Inventors: Rod Fleck, München, Germany; Mark Poret, Mesa, Ariz.; Karl-Heinz Mattheis, Fraunberg, Germany; Javier V. Magana, Austin, Tex.; Christoph Meinhold, Planegg, Germany

[73] Assignee: Siemens Aktiengesellschaft, Munich, Germany

[21] Appl. No.: 224,080

[22] Filed: Apr. 7, 1994

Related U.S. Application Data

[63] Continuation of Ser. No. 777,649, Oct. 15, 1991, abandoned.

[30] Foreign Application Priority Data

Oct. 12, 1990 [EP] European Pat. Off. ............ 90119633

[51] Int. Cl.⁶ ............................................ G06F 9/32
[52] U.S. Cl. ...................... 395/375; 395/800; 364/231.8; 364/261.3; 364/DIG. 1
[58] Field of Search .................................. 395/800, 725, 395/650, 425, 375

[56] References Cited

U.S. PATENT DOCUMENTS

| | | | |
|---|---|---|---|
| 4,594,659 | 6/1986 | Guenthner et al. | 395/375 |
| 4,777,587 | 10/1988 | Case et al. | 395/375 |
| 4,827,402 | 5/1989 | Wada | 395/375 |
| 4,835,679 | 5/1989 | Kida et al. | 395/375 |
| 4,912,635 | 3/1990 | Nishimukai et al. | 395/375 |
| 4,926,323 | 5/1990 | Baror et al. | 395/375 |
| 4,942,520 | 7/1990 | Langendorf | 395/375 |
| 5,050,068 | 9/1991 | Dollars et al. | 395/375 |
| 5,136,696 | 8/1992 | Beckwith et al. | 395/375 |
| 5,146,570 | 9/1992 | Hester et al. | 395/800 |
| 5,148,532 | 9/1992 | Narita et al. | 395/375 |
| 5,150,469 | 9/1992 | Jouppi | 395/375 |

FOREIGN PATENT DOCUMENTS 0135844  4/1985  European Pat. Off. .

OTHER PUBLICATIONS

IEEE, New York, US: Jun. 5–7, 1984 (Wedig et al.) pp. 119–125.

IEEE, New York, US: Oct. 9, 1986 (Nishimukai et al.) pp. 336–339 (High Performance 32–bit Microprocessor).

Elektronik vol. 2, Jan. 19, 1990 (Nissen et al.) pp. 46–56.

*Primary Examiner*—Alyssa H. Bowler
*Assistant Examiner*—Alpesh M. Shah
*Attorney, Agent, or Firm*—Herbert L. Lerner; Laurence A. Greenberg

[57] ABSTRACT

An apparatus for furnishing instructions having a multi-stage pipeline processing unit for processing at least a "fetch instruction" phase, a "decode instruction" phase and an "execute instruction" phase, includes a memory; an address register having contents pointing to an instruction to be processed in said memory; an instruction register for receiving a loading of the instruction during an instruction loading phase; an arithmetic calculation unit for calculating addresses; an incrementing stage for incrementing the contents of said address register; and a multiplexer for selecting a calculated address or an incremented successor address. One embodiment also includes a first additional memory unit; a second additional memory unit; an address comparator; and a third additional memory unit. Another embodiment also includes a first additional memory unit; a second additional memory unit; an address comparator; and a third additional memory unit.

10 Claims, 1 Drawing Sheet

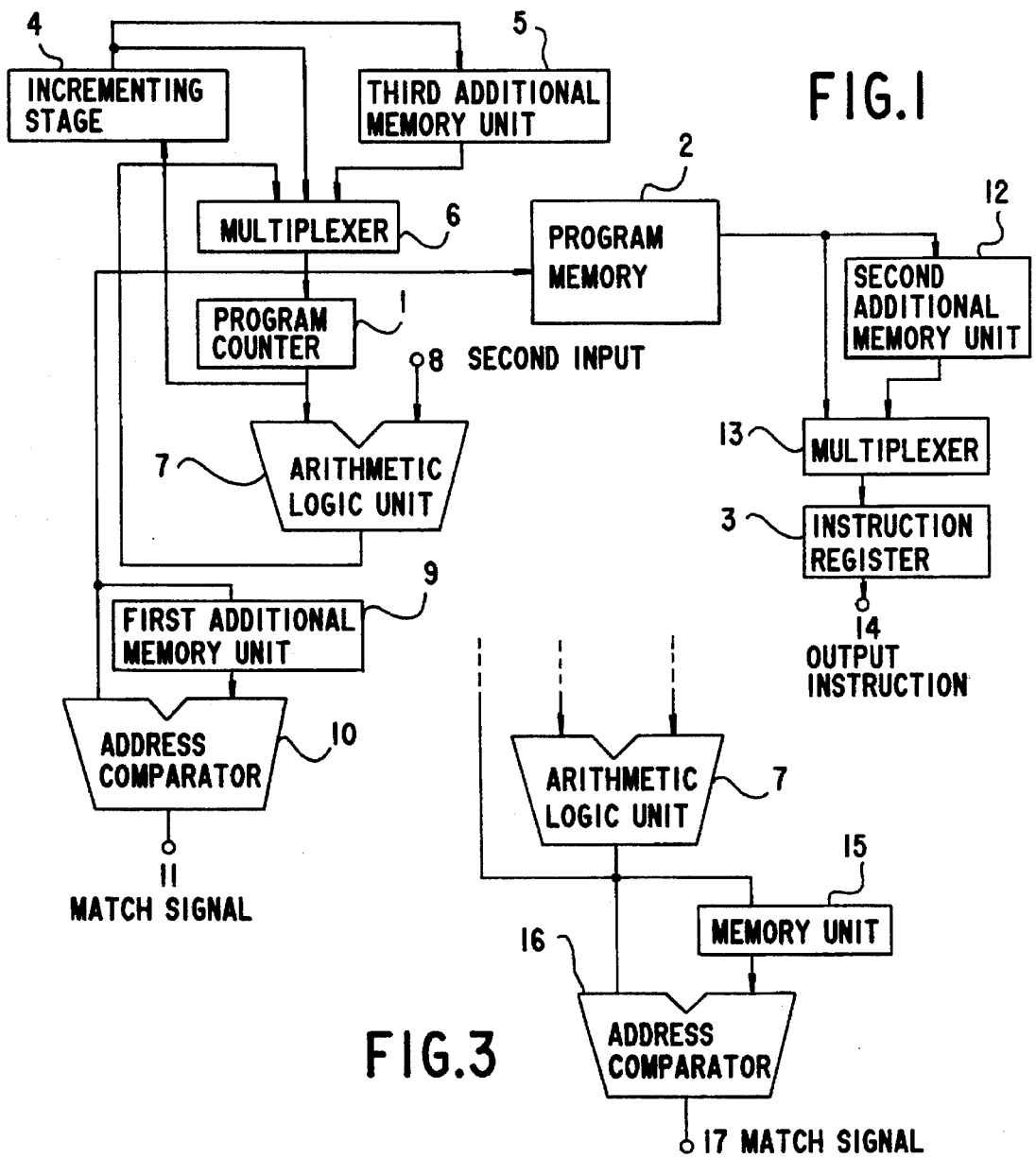

APPARATUS FOR FURNISHING INSTRUCTIONS IN A MICROPROCESSOR WITH A MULTI-STAGE PIPELINE PROCESSING UNIT FOR PROCESSING INSTRUCTION PHASE AND HAVING A MEMORY AND AT LEAST THREE ADDITIONAL MEMORY UNITS

This application is a continuation of application Ser. No. 07/777,649, filed Oct. 15,1991, now abandoned.

BACKGROUND OF THE INVENTION

The invention relates to an apparatus for furnishing instructions in a microprocessor with a multi-stage pipeline processing unit, the processing of which at least includes a "fetch instruction" phase, a "decode instruction" phase and an "execute instruction" phase, including an address register, the contents of which point to an instruction to be processed in a memory, the instruction being loaded during an instruction loading phase into an associated instruction register having an arithmetic calculation unit for calculating addresses, means for incrementing the address register contents, and a multiplexer for selecting the calculated address or the incremented successor address.

The demands made of microprocessors or microcontrollers increase with each generation of development, so that modern microprocessors are provided with processing units that previously were typical only in mainframe systems. One of the processing units makes it possible to process instructions quasi-parallel. The microprocessor or microcontroller includes so-called pipeline architecture for such a purpose. One such pipeline architecture is described in the publication Elektronik [Electronics], No. 2, January 1990, pp. 46 ff. Normally, a plurality of steps are required to carry out one instruction. In pipeline architecture, such steps are subdivided into the most equal possible substeps. Each substep can then be processed autonomously, or in other words independently of the other substeps. In order to carry out an instruction completely, the execution must run through all of the substeps sequentially. Typically, processors have three to five-stage pipelines. A three-stage pipeline will be described below:

1. Fetch: fetch an instruction. An instruction is fetched from the internal or external memory, based on the address in the program counter.
2. Decode: decode an instruction. During such a phase, the operands required are fetched from the internal or external memory. The instruction to be processed at a given time is also decoded. Data that a previous instruction has generated are likewise made available to the instruction to be processed.
3. Execute: carry out an instruction. Taking into account the signals that were generated during the decoding phase, the arithmetic logic unit or other execution units (such as shifters or multipliers) carry out the desired calculation. During the second phase of such a stage, the result is written back in the internal or external memory.

Each of the above stages can naturally be broken down into even more substages. When successive instructions are carried out, the pipeline is filled from clock cycle to clock cycle, on the principle of a production line. Once the pipeline is completely filled, then virtually only one more clock cycle is needed to carry out an instruction. That is naturally true only when correspondingly long programs are carried out. The above-described three-stage pipeline accordingly makes it possible to carry out instructions three times as fast as in previous microprocessors. Naturally, such an increase in performance is achieved only if the instructions follow one another sequentially. If a jump instruction occurs while the instruction is being carried out, that interrupts the flow through the pipeline, since the address of the next instruction to be processed can be ascertained only during the decoding phase. Since jump instructions, in many applications, represent a major proportion of the instructions of a microprocessor or microcontroller that are carried out, especially in the case of program loops, the increase in performance by the factor of three cannot always be assured during the running of the program.

A previous solution to the problem is known as "delayed branching". Upon the appearance of a jump instruction, a so-called "no operation" instruction NOP is always appended. As a result of the delayed processing of the actual jump target instruction, the correct target instruction is always loaded, since there is enough time to calculate the target address. The disadvantage is that when jump instructions occur, one cycle is basically lost. Instead of the "no operation" instruction, some other instruction included in the program course may be preferred under some circumstances. However, that instruction must have no influence on the jump instruction and must meet certain conditions, which severely limit the selection of such an instruction.

It is accordingly an object of the invention to provide an apparatus for furnishing instructions in a microprocessor, which overcomes the hereinafore-mentioned disadvantages of the heretofore-known devices of this general type, which has a multi-stage pipeline processing unit and which makes it possible to process jump instructions in loops, with the least possible loss of speed.

SUMMARY OF THE INVENTION

With the foregoing and other objects in view there is provided, in accordance with the invention, an apparatus for furnishing instructions in a microprocessor having a multi-stage pipeline processing unit for processing at least a "fetch instruction" phase, a "decode instruction" phase and an "execute instruction" phase, comprising a memory; an address register being connected to the memory and having contents pointing to an instruction to be processed in the memory; an instruction register connected to the memory for receiving a loading of the instruction during an instruction loading phase; an arithmetic calculation unit connected to the address register for calculating addresses; means connected to the address register for incrementing the contents of the address register; a multiplexer connected to the address register for selecting a calculated address or an incremented successor address; at least one first additional memory unit connected to the address register for temporarily storing an associated jump instruction address upon the occurrence of a jump instruction and in the presence of a corresponding jump condition; at least one second additional memory unit connected to the memory and associated with each first additional memory unit for storing an instruction belonging to a jump target address in memory; at least one address comparator connected to the address register and to the first additional memory unit for generating a match signal causing an instruction in the at least one second additional memory unit to be taken over into the instruction register, if a match occurs between the jump instruction address and the contents of the first additional memory unit, and in the presence of a corresponding jump condition; and at least one third additional memory unit connected to the multiplexer for storing a jump target successor address in memory after calculation of the jump target address and for delivering the jump target successor address to the multiplexer, the multiplexer selecting the jump target successor address present in the at least one third additional memory unit upon generation of the match signal.

With the objects of the invention in view, there is also provided an apparatus for furnishing instructions in a microprocessor having a multi-stage pipeline processing unit for processing at least a "fetch instruction" phase, a "decode instruction" phase and an "execute instruction" phase, comprising a memory; an address register being connected to the memory and having contents pointing to an instruction to be processed in the memory; an instruction register connected to the memory for receiving a loading of the instruction during an instruction loading phase; an arithmetic calculation unit connected to the address register for calculating addresses; means connected to the address register for incrementing the contents of the address register, a multiplexer connected to the address register for selecting a calculated address or an incremented successor address; at least one first additional memory unit connected to the address register and to the arithmetic calculation unit for temporarily storing a determined jump target address upon the occurrence of a jump instruction; at least one second additional memory unit connected to the memory and associated with each first additional memory unit for storing the instruction belonging to the jump target address in memory; at least one address comparator connected to the address register and to the at least one first additional memory unit for generating a match signal causing the instruction in the at least one second additional memory unit to be taken over into the instruction register if a match occurs between the determined successor address and the contents of the at least one first additional memory unit; and at least one third additional memory unit connected to the multiplexer for storing the jump target successor address after calculation of the jump target address and for delivering the jump target address to the multiplexer, the multiplexer selecting the jump target successor address present in the at least one third additional memory unit upon generation of the match signal.

In accordance with another feature of the invention, the memory is inside or outside the microprocessor.

In accordance with a concomitant feature of the invention, the memory is a read-only memory or a read/write memory.

It is an advantage of the invention that a microprocessor or microcontroller with pipeline architecture, even in the case of program loops with conditional jump instructions, suffer virtually no loss of speed as compared with conventional systems with pipeline architecture. "Delayed branching" does not take place. However, this is only true for jump instructions having a static jump address. In other words, the target address determined by the jump instruction must not vary during the course of the program. However, such static jump instructions do make up most of the set of jump instructions in a microprocessor. This is achieved in a simple manner by temporary storage of the jump instruction address or jump target address and of the jump target instruction, by means of simple memory units for address and data and by means of suitable control logic. Advantageously, only the address of the jump instruction, the target instruction or in other words the instruction stored in memory at the jump address, and the successor address to the jump target are stored in memory. With suitably fast processing units, in particular the arithmetic logic unit, the jump target address can be temporarily stored as well, instead of the jump instruction address.

If there is a match between the address of a jump instruction or the jump target address and an address stored in the memory unit, and if the proper flags for program branching have been set by the preceding instruction, then the target instruction and the successor address to the jump target are transferred to the corresponding pipeline stages. There is enough processing time within one cycle since the address of the jump instruction can be compared immediately, or in other words at the beginning of a cycle, because the jump target address can be ascertained suitably fast. Depending on the size of the pipeline, additional memory units for storing data to be processed must be provided, so that the preceding pipeline stages will be provided with the correct data upon a jump. Another advantage is that any arbitrary instruction can follow a jump instruction, and the target address can be located arbitrarily in the internal or external ROM or RAM.

Other features which are considered as characteristic for the invention are set forth in the appended claims.

Although the invention is illustrated and described herein as embodied in an apparatus for furnishing instructions in a microprocessor, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 s a block circuit diagram of a first apparatus according to the invention for furnishing instructions in a microprocessor;

FIG. 2 is a table showing the flow of a program loop in a multi-stage pipeline architecture according to the invention; and FIG. 3 is a portion of a block circuit diagram of a second apparatus according to the invention for furnishing instructions in a microprocessor.

DESCRIPTION OF THE PREFERRED EMBODIMENTS

Referring now to the figures of the drawing in detail and first, particularly, to FIG. 1 thereof, there are seen components which are essential for furnishing instructions in a "fetch" pipeline stage in a microprocessor or microcontroller. Contents of a program counter or address register 1 are delivered both to a first input of an arithmetic logic unit 7 and to an incrementing stage 4. Starting data for the incrementing stage 4 are delivered to a third additional memory unit 5. This memory unit serves to store a successor address to a jump target. A multiplexer 6 has inputs which are supplied with the output data of the arithmetic logic unit 7, the output data of the incrementing stage 4, and the output data of the memory unit 5 for storing the second from the next successor address if a jump instruction occurs. The output of the multiplexer 6 is connected both to the input of the program counter 1 and to a program memory 2. The program counter offset (in the case of relative jumps), or the absolute jump target address, which are furnished by a decoding stage, are present at a second input 8 of the arithmetic logic unit 7. The output of the multiplexer 6 is also connected both to a first input of an address comparator 10 and, through a first additional memory unit 9, to a second input of the address comparator 10. The output of the address comparator 10 furnishes a signal 11 that indicates a match between an address furnished by the multiplexer 6 and an address stored in the memory unit 9. The program or instruction memory 2 has a data output at which the address data are present. The output of the program memory 2 is connected to a first input of a multiplexer 13 and to a further or second additional memory unit 12. The output of the memory unit 12 is connected to a second input of the multiplexer 13. The output of the multiplexer 13 is connected to an instruction register 3. An instruction necessary for the decoding stage can be picked up at an output 14 of the instruction register 3.

Signal lines that are necessary for controlling the multiplexers 6, 13, the comparator 10, the arithmetic control unit, and so forth, have not been included in FIG. 1, for the sake of simplicity.

In order to furnish instructions, in normal operation, the address located at the program counter 1 is raised in the incrementing stage 4 by the applicable instruction length, so that the address present in the incrementing stage 4 points to the instruction immediately following in the program memory 2. This address is selected through the multiplexer 6 in the case of linearly successive instructions and stored in memory in the program counter. The program memory 2 is also addressed with this address. The associated instruction is then taken over, through the multiplexer 13, by the instruction register 3 and transferred to the next decoding stage in succession in the pipeline.

If a jump instruction with a static jump address is detected in the decoding stage, the following course of events takes place:

A check is made as to whether or not this jump instruction has already been processed previously. To this end, the address of the jump instruction is compared by the comparator 10 with the contents of the memory unit 9. Two states prevail if the jump conditions are met:

a) If there is no match, the jump target address is calculated by the arithmetic logic unit 7 and carried to the multiplexer 6. The jump instruction address is stored in the memory unit 9. The instruction linearly following the jump instruction is erased from the instruction register or replaced with a so-called "no operation" instruction NOP. In the next cycle in succession, the newly calculated jump target address is then selected by the multiplexer 6. The newly calculated address is stored in memory in the program counter and again raised in the incrementing stage 4. This jump target successor address is then stored in the memory unit 5. The address selected by the multiplexer 6 is delivered to the program memory 2, and the instruction addressed thereby is both delivered to the instruction register 3 through the multiplexer 13 and stored in the memory unit 12.

b) If there is a match, the instruction present in the memory unit 12 is transferred to the decoding stage through the multiplexer 13. The linear successor instruction ascertained previously in the "fetch" instruction furnishing stage is erased as a result. The instruction furnishing stage then selects the jump target successor address that was stored in the memory unit 5 through the multiplexer 6, and delivers it to the program counter and to the program memory in a known manner.

In the case of all of the other jump instructions, in other words jump instructions with dynamic jump addresses, pipeline processing having the usual course follows. In other words, a "no operation" instruction must be inserted, or else one cycle within the pipeline processing is lost.

If the jump conditions are not met, then a normal sequential program course follows, as described above for instruction furnishing during normal operation.

Furnishing of the jump target successor address could also be carried out by delivering the instruction target address from the output of the arithmetic logic unit 7 directly to the incrementing stage 4, for instance through a multiplexer. In that case, the register 5 could be dispensed with. The essential factor is that if there is a match of addresses at the comparator 10, the "fetch" instruction furnishing stage of the pipeline is furnished with the jump target successor address.

The pickup of the comparison address for the comparator 10 could also be performed after the incrementing stage 4 or after the program counter 1. The essential factor in this case is timing. The comparison must take place as early as possible after detection of the jump instruction, so that there will be sufficient time for the subsequent operations.

The method described is not enabled by the internal flow control of the microprocessor after each reset operation until after the first jump instruction is carried out, because until then the contents of the memory unit 9 are undefined.

The precise flow will be described below in detail in conjunction with FIG. 2 and a small demonstration program. The demonstration program is as follows:

| Block move: | | |
|---|---|---|
| | MOV | R0, # Buffer start |
| | MOV | R1, # Table start |
| Loop: | MOV | |R0|, |R+| |
| | CMPI2 | R0, # Buffer end |
| | JMP | CCNE, Loop |
| | RET | |

The demonstration program illustrates the flow within the pipeline architecture when a program loop is run. The program makes it possible to copy a data block from a source address to a target address. The first two MOV instructions load the source and target addresses into the registers R0 and R1. The first instruction of the loop, MOV, copies the contents of the memory cell to which the register R1 points to the memory cell to which the register R0 points, and then increments the register R1. The next instruction, CMPI2, compares the contents of the register R0 with the end address of the block to be transferred and increments the register R0. The jump instruction JMP follows, at the beginning of the loop. As long as the register R0 is not equal to the block end address, the loop is repeated. A return jump instruction RET then follows at the end.

FIG. 2 illustrates the flow inside the pipeline. The symbols T1–TN+1 identify individual successive clock cycles of the processor. The various stages of a four-stage pipeline are identified as fetch, decode, execute and write. At a time T1, the pipeline has already been fully loaded. The first instruction MOV R0, # Buffer start of the demonstration program has already been carried out. The second instruction, MOV R1, # Table start is located in the fourth pipeline stage "write". The third instruction, MOV |R0|, |R1+| is located in the execution stage "execute"; the fourth instruction CMPIZ R0, # Buffer end, is in the decoding phase, "decode"; and the fifth instruction, JMP CCNE, Loop is located in the loading phase "fetch". At a time T2, the contents of the pipeline shift by one stage, so that the jump instruction JMP is then located in the decoding stage, and the instruction RET that follows the jump instruction JMP is fetched from the memory, since at this time the comparator 10 does not find a match between the contents of the memory unit 9 and the address selected by the multiplexer 6. At a time T3, the contents of the pipeline shift onward by a further stage. Due to the absence of a match in the addresses ascertained, the instruction RET then located in the decoding phase "decode" is erased, and the instruction located at the address ascertained at the time T2 during the decoding phase is loaded into the instruction register 3.

The jump instruction address and the associated jump target instruction are then temporarily stored in the corresponding memory units 9, 12. Furthermore, the incremented jump target address is stored in the memory unit 5. Until a time T5, normal processing then takes place in the pipeline. At the time T5, the jump instruction JMP is again decoded. However, the address selected by the multiplexer 6 then does match the contents of the memory unit 9. As a result, in an ensuing processing phase T6, the instruction located at the jump target address, which of course has already been stored in the memory unit 12, is transferred directly to the decoding stage "decode". The loading stage "fetch" receives the successor address, located in the memory unit 5, to the jump target address. In this way, no further cycle is lost for the remainder of the passages through the loop. Finally, in the cycles TN and those following, the execution of the return jump instruction RET takes place.

The size of the memory units 5, 9 and 12 must be selected in such a way that at least the applicable instruction or the applicable addresses can be stored in memory. If a plurality of comparators 10 and associated memory units 9 are each connected in parallel, then a plurality of addresses of jump instructions can be temporarily stored, for instance in interconnected program loops. In the same way, a plurality of memory units 5 and 12 should then be provided, so as to store the various associated jump target instructions or jump target successor addresses.

If the memory units 5, 9, 12 are selected to be larger than the instruction to be stored in memory, then the possibility exists, with a sufficiently fast memory, of storing a plurality of successor instructions and addresses in memory.

Another capability of ascertaining whether or not a jump instruction has already been carried out includes temporarily storing not the address of the jump instruction but rather the jump target address, and later comparing it with jump target addresses that arise in the program.

FIG. 3 shows only the portion of the block circuit diagram according to the invention for instruction furnishing that has been modified as compared with FIG. 1. As in FIG. 1, input and output signals are delivered to an arithmetic logic unit 7.

The output of the arithmetic logic unit 7 is connected both to a first input of an address comparator 16 and, through a memory unit 15, to a second input of the address comparator 16. An output 17 of the address comparator 16 furnishes a signal that indicates a match between the address calculated by the arithmetic logic unit 7 and the address stored in the memory unit 15.

In normal operation, the address furnished by the incrementing stage is delivered through the multiplexer 6 to the address inputs of the program memory 2. The corresponding instruction is then stored in memory in the instruction register 3 and delivered to the next successive decoding stage in the pipeline. At that time the incrementing stage 4 raises the counter state of the program counter 1 by the length of the instruction present in the program counter 1.

If a jump instruction is recognized, then the arithmetic logic unit 7 calculates the corresponding address and transfers it to the multiplexer 6. The address comparator 16, which is connected to the output side of the arithmetic logic unit 7, compares the calculated address with the address stored in the memory unit 15. If there is no match between the contents of the memory unit 15 and the address calculated by the arithmetic logic unit 7, the address calculated by the arithmetic logic unit 7 is transferred through the multiplexer 6 to the address inputs of the program or instruction memory 2. Moreover, the calculated address is incremented by the applicable instruction length by means of the incrementing stage 4 and is stored in memory in the memory unit 5. The particular instruction addressed in the program memory 2 is then stored in memory in the memory unit 12 and again taken over into the instruction register 3 and transferred to the next decoding stage. In addition, the instruction previously transferred to the decoding stage is erased or replaced by an NOP instruction. If there is a match, the associated instruction already previously stored in the memory unit 12 is located into the instruction register 3 through the multiplexer 13 and then transferred to the decoding stage. If there is a match, the jump target address incremented in the register 5 is also transferred, through the multiplexer 6, to the address inputs of the program or instruction memory 2.

Furnishing of the jump target successor address could also be carried out by the variation present in FIG. 1.

In the exemplary embodiment shown in FIG. 3, a plurality of comparators 16 and associated memory units 15 can each be connected in parallel, as has also been described with reference to FIG. 1.

The invention can be used in any microprocessors or microcontrollers that have pipeline architecture.

We claim:

1. An apparatus for furnishing instructions in a microprocessor having a multi-stage pipeline processing unit for processing at least a "fetch instruction" phase, a "decode instruction" phase and an "execute instruction" phase, comprising a program memory; an address register being connected to said program memory and having contents pointing to an instruction to be processed in said program memory; an instruction register connected to said program memory for receiving the instruction during an instruction loading phase; an arithmetic calculation unit connected to said address register for calculating addresses; means connected to said address register for incrementing the contents of said address register; a multiplexer connected to said means for incrementing, to said arithmetic calculation unit, and to said address register for selecting a calculated address or an incremented successor address; at least one first additional memory unit connected to said address register for temporarily storing a jump instruction address upon the occurrence of a jump instruction and in the presence of a corresponding jump condition; at least one second additional memory unit connected to said program memory and associated with said first additional memory unit for storing an instruction belonging to a jump target address in said program memory; at least one address comparator connected to said address register and to said first additional memory unit for generating a match signal causing the instruction in said at least one second additional memory unit to be taken into said instruction register, if a match occurs between the jump instruction address and the contents of said first additional memory unit, and in the presence of the corresponding jump condition; and at least one third additional memory unit connected to said multiplexer for storing a jump target successor address in the program memory after calculation of the jump target address and for delivering the jump target successor address to said multiplexer, said multiplexer selecting the jump target successor address present in said at least one third additional memory unit upon generation of the match signal.

2. The apparatus for furnishing instructions in a microprocessor according to claim 1, wherein said program memory is inside the microprocessor.

3. The apparatus for furnishing instructions in a microprocessor according to claim 1, wherein said program memory is outside the microprocessor.

4. The apparatus for furnishing instructions in a microprocessor according to claim 1, wherein said program memory is a read-only memory.

5. The apparatus for furnishing instructions in a microprocessor according to claim 1, wherein said program memory is a read/write memory.

6. An apparatus for furnishing instructions in a microprocessor having a multi-stage pipeline processing unit for processing at least a "fetch instruction" phase, a "decode instruction" phase and an "execute instruction" phase, comprising: a program memory; an address register being connected to said program memory and having contents pointing to an instruction to be processed in said program memory; an instruction register connected to said program memory for receiving a loading of the instruction during an instruction loading phase; an arithmetic calculation unit connected to said address register for calculating addresses; means connected to said address register for incrementing the contents of said address register, a multiplexer connected to said arithmetic calculation unit, to said means for incrementing, and to said address register for selecting a calculated address or an incremented successor address; at least one first additional memory unit connected to said arithmetic calculation unit for temporarily storing a calculated jump target address upon the occurrence of a jump instruction; at least one second additional memory unit connected to said program memory and associated with said at least one first additional memory unit for storing the instruction belonging to the jump target address in said program memory; at least one address comparator connected to said arithmetic calculation unit and to said at least one first additional memory unit for generating a match signal causing the instruction in said at least one second additional memory unit to be taken into said instruction register if a match occurs between the calculated jump target address and the contents of said at least one first additional memory unit; and at least one third additional memory unit connected to said multiplexer for storing a jump target successor address after calculation of the jump target address and for delivering the jump target successor address to said multiplexer, said multiplexer selecting the jump target successor address present in said at least one third additional memory unit upon generation of said match signal.

7. The apparatus for furnishing instructions in a microprocessor according to claim 6, wherein said program memory is inside the microprocessor.

8. The apparatus for furnishing instructions in a microprocessor according to claim 6, wherein said program memory is outside the microprocessor.

9. The apparatus for furnishing instructions in a microprocessor according to claim 6, wherein said program memory is a read-only memory.

10. The apparatus for furnishing instructions in a microprocessor according to claim 6, wherein said program memory is a read/write memory.

* * * * *